United States Patent
Ben-Michael et al.

(10) Patent No.: US 6,459,692 B1
(45) Date of Patent: Oct. 1, 2002

(54) INTERMITTENT NODE RESOLUTION FOR VOICE AND DATA COMMUNICATION SYSTEM

(75) Inventors: Rafael Ben-Michael, Scotch Plains, NJ (US); Robert Bennett, Brick, NJ (US); Theodore P. Jamer, Union, NJ (US); Robert Raymond Miller, II, Township of Morris, NJ (US); Anatoly A. Tsaliovich, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/327,792

(22) Filed: Jun. 8, 1999

Related U.S. Application Data

(60) Provisional application No. 60/115,712, filed on Jan. 12, 1999.

(51) Int. Cl.[7] ............................ H04Q 7/28; H04B 7/212
(52) U.S. Cl. .......................................... 370/341; 370/442
(58) Field of Search ................................. 370/294, 314, 370/321, 326, 329, 332, 335, 336, 338, 341, 346, 358, 442, 431, 437, 458

(56) References Cited

U.S. PATENT DOCUMENTS

| | | | | |
|---|---|---|---|---|
| 4,782,485 A | * | 11/1988 | Gollub | 370/118 |
| 5,365,512 A | * | 11/1994 | Combs et al. | 370/16 |
| 5,892,794 A | * | 4/1999 | Slegers | 375/219 |

* cited by examiner

*Primary Examiner*—Wellington Chin
*Assistant Examiner*—Brenda Pham

(57) ABSTRACT

A method of identifying and communicating the existence of Intermittent nodes in a communication network with a mixed TDMA/CSMA-CD MAC frame format, and of preventing these nodes from unnecessarily debasing existing voice channel connections. Information pertaining to intermittent nodes is included in a database for an extended operational duration and used as primary information in control of the creation of any newly requested voice channels. Intermittent nodes are treated for the purpose of assigning voice channels as existing permanent nodes, whether currently visible or not. Newly revealed intermittent nodes are added to the database through intermediate nodes. This invention increases reliability and quality of voice communications during noise/impedance level changes of the network that may render one or more nodes not visible.

8 Claims, 5 Drawing Sheets

FIG. 4

| MODEMS | PRESENCE | CONNECTION | VOICE CHANNEL (IN USE) | ENCODING | PARAMETER (AVG BER) | OTHER |
|---|---|---|---|---|---|---|
| IDENTIFIER 1 | SELF | SELF | #2 | | | |
| IDENTIFIER 2 | VISIBLE | CONNECTED | #2 | 16 QAM | $10^{-7}$ | |
| IDENTIFIER 3 | VISIBLE | NC | | 32 QAM | $10^{-8}$ | |
| IDENTIFIER 4 | INTERMITTENT | NC | #3 | | | |
| IDENTIFIER 5 | VISIBLE | NC | | | | |
| IDENTIFIER 6 | INTERMITTENT | NC | #3 | | | |

.# INTERMITTENT NODE RESOLUTION FOR VOICE AND DATA COMMUNICATION SYSTEM

This application claims the benefit of provisional application No. 60/115,712, filed Jan. 12, 1999.

FIELD OF THE INVENTION

This invention relates to voice and data transmission on a network with one or more nodes not able to consistently communicate with the other network nodes. These nodes, known as intermittent nodes, are sporadically visible to the other network nodes or modems. This invention specifically concerns the management of an intermittent node presence to prevent voice channel interference and/or channel indeterminacy. Prevention of node or modem interference with one another is a prime consideration of the invention.

BACKGROUND OF THE INVENTION

Poor quality communication channels having time and frequency variable transfer functions (noise levels, impedance levels, frequency response, etc.) have a tendency to intermittently mask one part of the network from other parts of the network. From a given vantage point on the network, this masking has the effect of intermittently adding and removing elements, such as nodes/modems, from the field of view (the apparent network of active and permanent nodes and modems visible at a given time).

Network communication performance is degraded and maybe totally destroyed by the effects of this intermittent masking. Voice channel collisions within a network (e.g., single LAN) results in destruction of information on one or all the contending voice channels when two network segments (e.g., LAN segments) become jointly visible. A system designed to be tolerant of these effects minimizes errors and maximizes voice transmission reliability.

SUMMARY OF THE INVENTION

Intermittent masking of nodes in a communication network is prevented from unnecessarily debasing existing voice channel connections by identifying intermittent nodes as each are presented to a portion of the network, and by remembering the intermittent nodes for an extended operational duration (i.e., a duration substantially exceeding any expected voice channel connection duration) as existing permanent nodes. The information regarding the existence of intermittent nodes is communicated throughout the network. The acknowledged existence of the intermittent nodes is included in a database and used as primary information in control of the creation of any newly requested voice channels. Voice channel allocation is coordinated between Sub-LANs that are intermittently isolated during periods where communication is available to minimize contention of voice channels.

In a specific embodiment the method of the invention is included as part of an access control protocol for a local area network (LAN), included in what is commonly called the MAC layer. This protocol is alternately part of the data link layer in the Open Systems Interconnection (OSI) model.

An illustrative embodiment of this invention is shown herein for a combined voice and data communication system, having communication links supporting both voice channels and data. In this embodiment both the active and intermittent nodes are retained in either a central database or a distributed database. If more than one voice signal (i.e., in a time division multiplexed voice communication arrangement) is presented for transmission the database listing provides both active and intermittent nodes as equals for consideration as a signal source to be granted access to a channel (i.e., time slot). Hence the intermittent node, by inclusion in the database, is eliminated as an unknown source of an interfering channel.

According to the invention the database listing is continuously updated. Intermittent nodes/modems are retained in the database listing for a substantial duration. After that time duration expires they are removed. Time slots/channels for any newly occurring voice signals are granted only after a review of activity of the nodes (i.e., both active and intermittent) in the database listing that are actively connected to channels (i.e., time slots). Time slots (i.e. channels) are investigated to determine their use. If any time slots (i.e., channels) are presently available (i.e., not used and not connected to a node listed in the database listing) they are assigned to receive voice signals from any other node listed in the database listing. (EXCEPTION: nodes determined to be intermittent at a specific time are not permitted to connect to each other.) Methods of assignment to minimize node interference during periods of "disconnect" between sub LANs, of an overall LAN system, may be used, such as starting with low number slots for sub a LAN-A and high number slots for a sub LAN-B, or as random channel assignments on all LANs. Optimization schemes, such as odd and even selections or other schemes may be used.

The invention is however not limited to this selection methodology. Other schemes will readily suggest themselves to those skilled in the art. Nodes not listed in the database listing are refused voice channel access until they are registered and recognized as node members of the network. If the database listing indicates that a certain number of nodes are assigned channels; newly active nodes must receive channels only from unassigned channels.

In the particular illustrative embodiment, disclosed herein, a communication system is envisioned in which both voice and data are transmitted. Voice is time division multiplexed into time slots (i.e., channels) and data signals are transmitted as a packet included as part of an over all frame which includes the voice channels. The voice channel section is normally fixed in duration while the data portion is variable in duration. Synchronization of the overall frame and its integral parts (i.e., voice and data) is maintained to prevent interference or clashing of the two parts of the frame with each other (i.e., such as the data portion of the overall frame intruding into the voice channel assigned section).

Synchronization of the frame is achieved through a master reference clock, by which synchronization is maintained throughout all system LANs and LAN segments.

An illustrative example of an application of the invention is in communication systems using power lines as communication links. Control methods, embodying principles of the invention, are utilized in this normally noisy environment. Power lines characteristically have high levels of noise and interference, multiple reflections, time varying transfer functions and stringent EMC requirements. These characteristics tend to mask system modems intermittently.

BRIEF DESCRIPTION OF THE DRAWING

FIG. 4 is a table of node status that is included in the database; and

DETAILED DESCRIPTION

Figure 1:
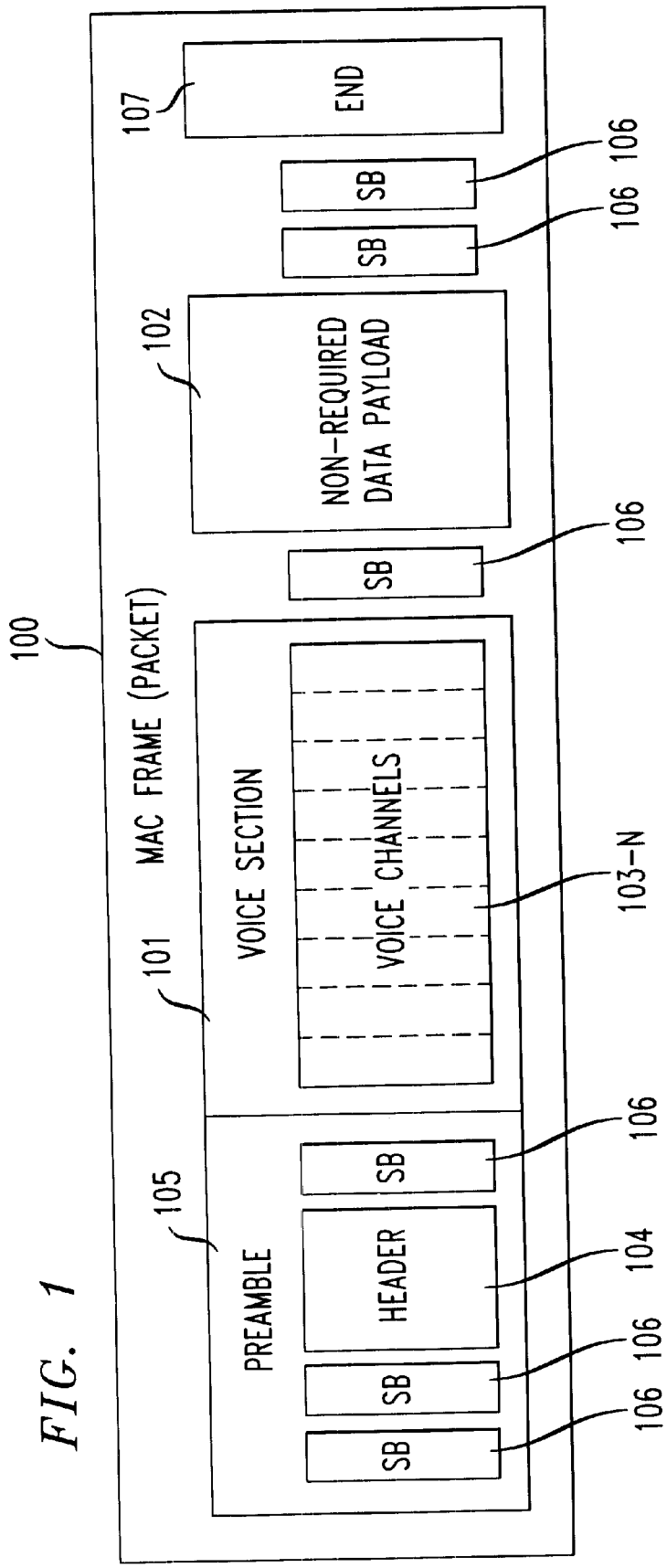
FIG. 1 is a schematic of a typical frame of voice and data that is transmitted over a network that is subject to noise and system impedance conditions resulting in intermittent masking of portions of the network.

A specific structure MAC frame (i.e., packet) 100, such as illustrated in FIG. 1, is required in order to meet time delay requirements and provide guaranteed throughput for voice in the system, as well as meeting data access and transport requirements. MAC frame characteristics include a fixed length frame, with separate sections identified and reserved for specific functions. Many MACs exist that meet this structure, such as the MAC proposed by Jin Ming Ho in patent application Ser. No. 09/222897 filed Dec. 30, 1998 and the ADAPT MAC proposed by Jim Dail in U.S. Pat. No. 5,570,355 issued Oct. 29, 1996.

A voice section 101, in the illustrative preferred embodiment, is based on Time Division Multiple Access (TDMA), with its size dependent on voice channel requirements. This section 101, used for voice channels, may be fixed or variable in length, with the non-required portion 102 being used for data payload. Section 101, dedicated for voice channels, is required to be properly sized for the maximum number of voice channels anticipated in order to guarantee voice traffic performance at some predefined level. The illustrative preferred embodiment, as shown, provides eight (8) voice channels 103-N. These voice channels will be dynamically assigned using a signaling and management header 104. (Traffic engineering is well known to those skilled in the art. Traffic analysis indicates that the number of voice channels required can be established for the expected customer density and usage.)

The header 104 will provide broadcast information concerning reservation, usage identification, and use of the voice channels. A preamble 105 supports the management and synchronization process involving a management section 104 and dedicated synchronization enhancement portion 106 which spreads the synchronization bits across the frame 100. A two-phase commit process using information in the header is used to ensure reservation and slot collision avoidance. The end of the frame and additional management is accomplished in section 107.

The data portion 102 uses a contention-based algorithm such as Carrier Sense Multiple Access with Collision Detection (CSMA/CD). Because of the harsh conditions of some transport media such as a power line, the pre-amble and frame synchronization control will be distributed/spread throughout the entire frame 100. The general structure of such a MAC is well known in the art and further detailed description is not necessary.

Figure 2:
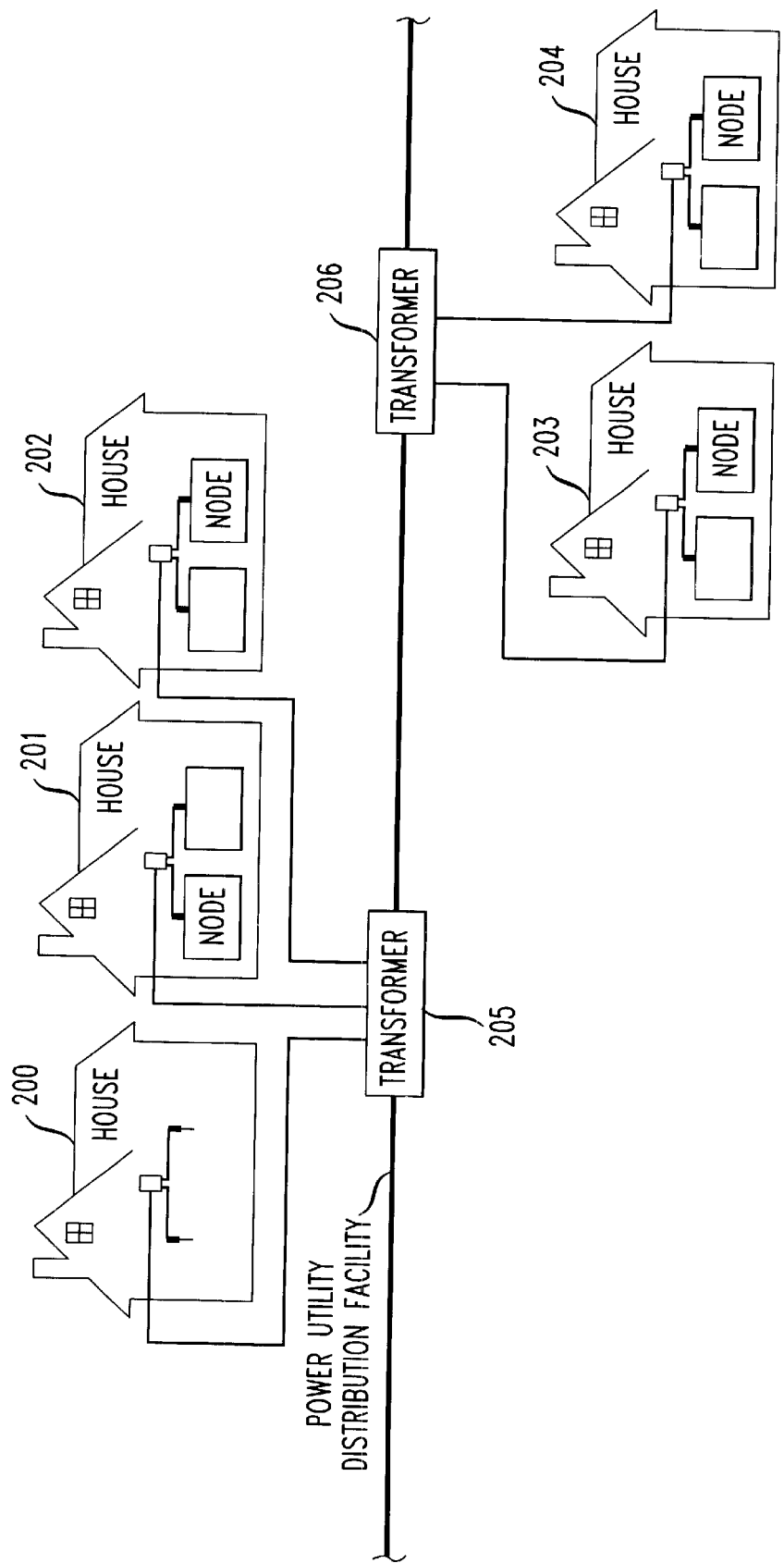
FIG. 2 is a schematic of a network using power lines for voice and data communication.

FIG. 2 is a schematic of the preferred embodiment depicting how this resolution methodology is used to provide voice and data service to subscribers using power line communication. In this example, there are two premises attached to a power utility. The utility's power distribution facilities form the network connecting two premises LANs—one in House 201 and one in House 202. Ideally, all the nodes in House 201 are isolated from the nodes in House 202, and similarly for House 202 to House 201. However, due to a changing transfer function of the power utility distribution facilities, this isolation is not always achieved. It is observed that communication between houses on a single transformer may even be likely. However, houses on different transformers are generally not in communication with devices on another transformer. Therefore a sub-LAN of Houses 200, 201, and 202 served by Transformer 205 is not generally expected to communicate with Houses 203 and 204 served by Transformer 206. This effectively isolates networks so that the database information does not generally propagate across transformers. It is observed that in the relatively rare case where communication occurs across transformers, this methodology treats the superset of the two transformers as one network.

Figure 3:
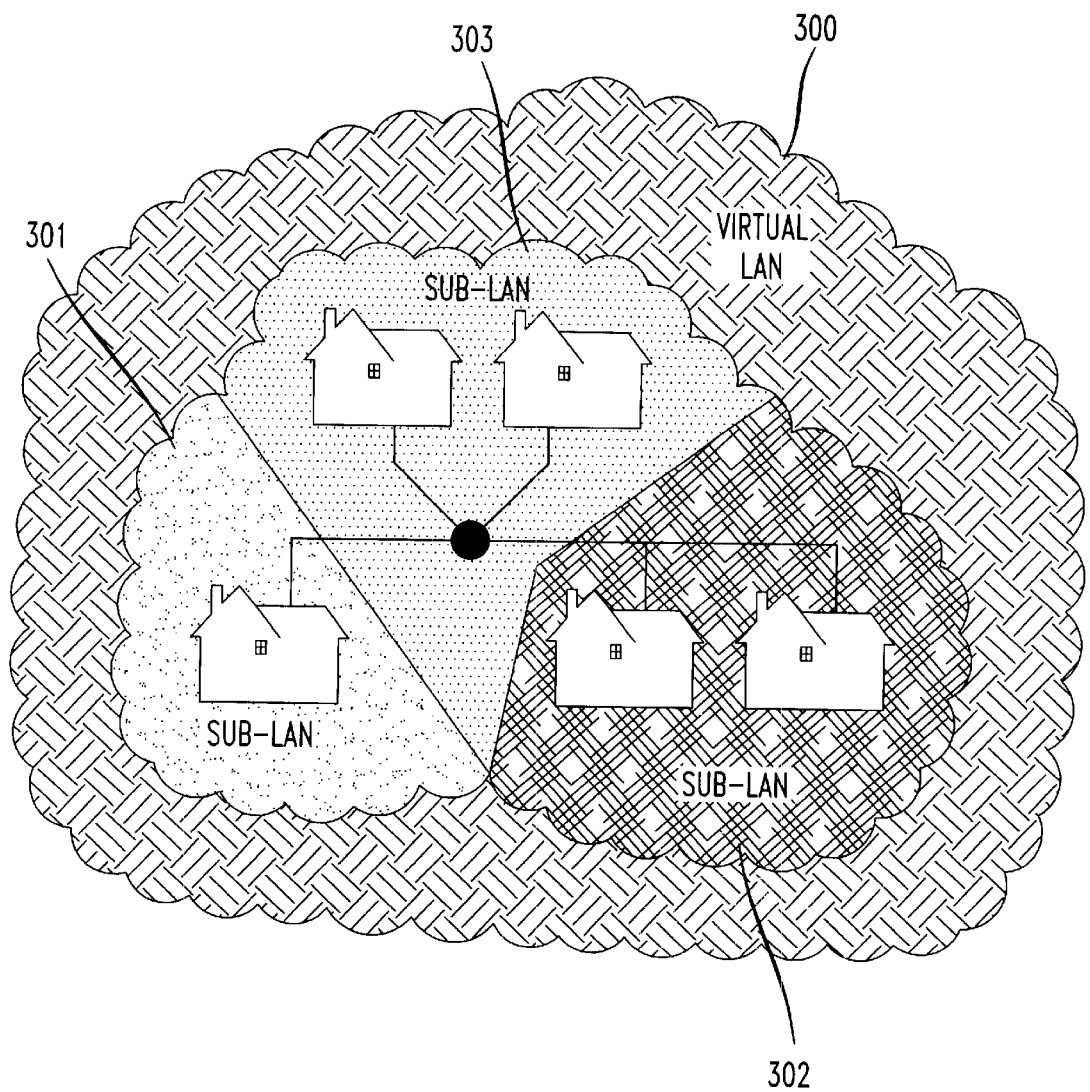
FIG. 3 is a schematic of sub-LAN segments that create a concatenated network.

Within the house, let us assume that all nodes are visible to others in the premises—although this does not need to be the case. The network formed by the power distribution plant contains multiple nodes connected by a single media. Because power line is a very noisy environment with rapidly changing transfer functions, FIG. 3 illustrates that sub-LAN 301 is not continuously visible to sub-LAN 302 due to the physical characteristics of that distribution plant such as distance between houses and electrical characteristics such as propagation loss.

If the devices in the premises are self-provisioning so that a virtual LAN 300 is established for all devices that can communicate with each other, the devices on sub-LAN 301 may not be aware of sub-LAN 302 at start up because of the physical characteristics at that time. There are devices in sub-LAN 303 that can see both sub-LAN 301 and sub-LAN 302. When noise levels drop—at night for instance when many appliances are not in use, LAN segments 301 and 302, with their related nodes, may become visible to the other for short periods of time, but most likely at a lower signal.

To prevent interference between the two visible LAN segments 301 and 302, each LAN segment needs to be aware of the others. In this instance, the nodes in sub-LAN 303 can provide this information because it can effectively communicate with sub LAN 301 and sub LAN 302. This condition relies on a few nodes that are able to connect to other sub LANs so that a complete network matrix including all network nodes can be created and maintained by all nodes to control interference. (It is observed here that while this preferred embodiment is based on a fully distributed database by node, alternate embodiments with a master node per house or per sub-LAN are also possible.)

Nodes continually attempt to communicate between themselves regardless of sub-LAN membership or visibility, helping to identify assigned voice slots and managing them until resolution either by disconnect messages or time-out. If newly acquired database information indicates a "rogue" intermittent node is operating using the same voice channel as another node in the second sub-LAN, the system assumes that a voice collision will occur and service will be compromised or lost. In this case the conflicting node's voice time slot is relocated to another slot to avoid dropping the call.

As shown in FIG. 3, during the brief periods of time where one or more nodes from either sub-LAN 301 and sub-LAN 302 are jointly visible, either in part or in total, each LAN segment must exchange information with the other LAN segment to minimize collisions of two or more voice channels in a particular time slot. This is accomplished via sub-LAN 303 which has status information from sub-LANs 301 and 302 and which passes that information as part of the management section 104 described with reference to FIG. 1. The information is applied to a channel selection algorithm that assumes the full time existence of both sub LANs and creating a complete concatenated network from the combination of sub LAN 301 and sub LAN 302. As previously discussed, each LAN will assign time slots in a random or other predetermined manner to diminish the possibility of collision during the time when communication between the LANs is not possible. In the event that each sub-LAN has unknowingly assigned the same time slot when they become jointly visible, one of the sub-LANs reassigns the conflicting channel to another available time slot. Many algorithms may be developed to accomplish this relocation function. In the preferred embodiment, the first node to recognize the conflict reassigns the voice channel to another slot and updates the assigned channel map. This may create a brief audible distortion. If no other slots are available, the call is dropped.

The conceptual elements of this invention are a process that describes the information exchanges required between sub LANs so that each is aware of the other and that information is exchanged between them. In addition, each sub LAN maintains a record containing all nodes that is slow to change.

The database, discussed above, stores the information concerning acceptable and available operative nodes in a look-up tabular format, which relates modems, their immediate presence state, connection state and active voice channels. The logical arrangement of such a table may be such as is shown illustratively in FIG. 4. The data stored in the illustrative table is used, by the system process to ensure that no newly activated voice channel uses a modem and channel potentially interfering to an active voice channel supported by an active modem. The table-stored data as used maximizes the through put of data by allowing voice channel slots to be used for data when possible. The table is continuously updated to show an accurate representation of voice channel usage at all times.

The table itself has columns listing; 1. Identity of all system modems, 2. A presence state of the identified modems, 3. A connection state of each of the identified modems, 4. Voice channels associated with each identified modem if any, and 5. Added parameters so associated. Hence voice channel usage is recorded, updated and assigned to enhance voice and data throughput.

Items such as modulation (column 5) are selected to accommodate system loads and conditions in an efficient manner. The recorded bit error rate contributes to controlling such efficient operation. Bit error rates need only be recorded where their use is needed.

The stored tabular information is used interactively to accommodate the addition of new voice channels in addition to providing information on existing conditions.

Figure 5:
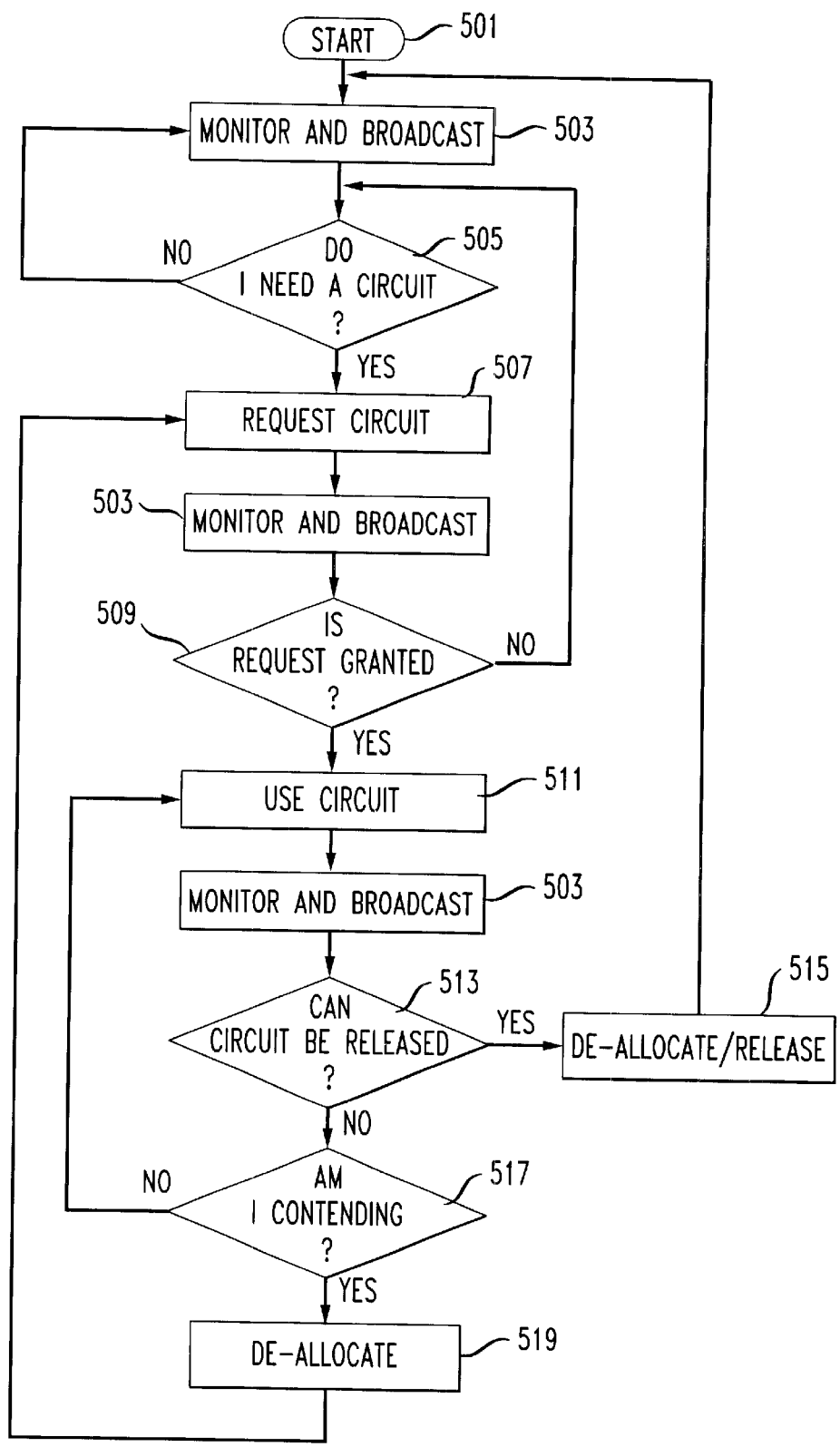
FIG. 5 is a schematic of a flow chart showing the process of control to manage intermittent masking of nodes and modems in a communication system.

One such process is illustrated in the flow chart of FIG. 5. The process begins in the start ellipse 501. The process proceeds to sub process block 503 which monitors the network for other visible nodes and receives network map broadcasts from each of them. The information is merged into a single map of all potentially visible nodes, and broadcast in the management section at a specific time. This allows each individual node to share its acquired information (acquired map or table) of visible nodes with all the other visible nodes.

After interchange of node information, an inquiry as specified by decision block 505 determines if a new virtual circuit is needed. If not, the monitor, build and broadcast process continues. If so, a sub process in block 507 selects an available timeslot and broadcasts its intention to establish a virtual circuit. Sub process 503 then monitors the broadcasts from neighboring nodes. Decision block 509 determines if the neighboring nodes acknowledge the request. If not, the request is repeated as part of a two phase commit process. If so, sub process 511 establishes the circuit and begins using it. It may occur that node a node or nodes may not respond from long periods of time. Unlike a traditional two phase commit process, channel assignment after a specific condition such as waiting a specific interval of time is needed because nodes are intermittent and may disconnect without messages. Therefore, channel assignment is permissible in this process even if a node does not reply. The non-responsive node is left in the data base until a specific condition is met such as a lengthy time out.

While using the circuit, sub process 503 continues to monitor, update and broadcast the network map. Decision block 513 determines if the circuit is still needed, e.g., there still is a voice call in process. If not, sub process 515 removes the circuit from the network map and broadcasts the updated map with a termination message to the other nodes. Sub process 503 then begins again.

If the circuit is still needed, decision block 517 examines the updated network map to determine if an intermittent node has become visible since the virtual circuit was established. If no contention exists, use continues. If a contention is observed, sub process 519 stops transmission, removes the virtual circuit from the network map without sending a disconnect message and repeats the request for timeslot procedure. A warning message may be sent to alter other nodes of the relocation in an alternate embodiment.

The process as illustrated demonstrates a single user at a node requesting and using a single timeslot. The process can be extended for multiple users per node.

What we claim is:

1. In a communication system including a plurality of nodes/modems connected by communication links and in which link quality renders at least one node/modem intermittent in connection with other nodes/modems in the communication system, comprising:

the links connecting the nodes/modems propagating frames of both voice and data signal with voice time division multiplexed and data includes as part of an overall frame;

a database listing all permanent and intermittent nodes/modems of a particular region of the communication system;

each node/modem operative for permitting a connection of voice signals through a particular choice channel to the network only if the voice channel is not pre-empted by an active assignment of a voice channel specified in the data base.

2. A communication system as claimed in claim 1, wherein:

the database is formatted in a tabular format.

3. A communication system as claimed in claim 2, wherein:

the database includes a list of assigned and unassigned visible nodes/modems, and new voice channels are assigned to unassigned visible nodes/modems.

4. A communication system as claimed in claim 3, wherein:

at least one instance of the database is included in a node/modem.

5. A method of time division assignment of voice channels within frames containing both voice channels and data, within a system of networked node/modems experiencing intermittent masking of some of the node/modems, comprising the steps of:

maintaining a database list of node/modems visible to each modem by working network connections; and maintaining those node/modems in the database list that have lost visibility to said each node/modem for a specified time duration;

said database list classifying the list of visible node/modems in accord with one of actively supporting voice channels and with availability for accepting voice channels assigning voice channels to voice channel requesting node/modems to available time division assignments.

6. The method of claim 5 further including a step of:

including the database list of node/modems visible to each node/modem in at least one of the node/modems.

7. The method of claim 5 further including a step of:

generating the database list of node/modems formatted in a tabular format.

8. The method of claim 7 further including a step of:

assigning newly requested voice channels by a node/modem to a voice channel reserved for nodes/modems visible to the requesting node/modem.

* * * * *